(12) United States Patent
Atkinson

(10) Patent No.: US 6,728,879 B1
(45) Date of Patent: Apr. 27, 2004

(54) TRANSACTIONAL LOG WITH MULTI-SECTOR LOG BLOCK VALIDATION

(75) Inventor: Robert G. Atkinson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/325,671

(22) Filed: Jun. 2, 1999

(51) Int. Cl.[7] ............... G06F 11/30; G06F 12/00; H04L 9/00
(52) U.S. Cl. ............ 713/168; 713/181; 713/193; 707/202; 707/204
(58) Field of Search ............. 713/168, 181, 713/193, 200; 707/202, 204

(56) References Cited

U.S. PATENT DOCUMENTS

| | | | |
|---|---|---|---|
| 5,125,091 A | | 6/1992 | Staas, Jr. et al. |
| 5,151,987 A | | 9/1992 | Abraham et al. |
| 5,170,480 A | * | 12/1992 | Mohan et al. ........... 707/201 |
| 5,212,793 A | | 5/1993 | Donica et al. |
| 5,278,982 A | | 1/1994 | Daniels et al. |
| 5,561,797 A | | 10/1996 | Gilles et al. |
| 5,689,708 A | | 11/1997 | Regnier et al. |
| 5,706,429 A | | 1/1998 | Lai et al. |
| 5,764,897 A | | 6/1998 | Khalidi |
| 5,781,910 A | | 7/1998 | Gostanian et al. |
| 5,790,789 A | | 8/1998 | Suarez |
| 5,875,291 A | | 2/1999 | Fox |
| 5,884,327 A | | 3/1999 | Cotner et al. |
| 5,890,161 A | | 3/1999 | Helland et al. |
| 5,907,675 A | | 5/1999 | Aahlad |
| 5,913,061 A | | 6/1999 | Gupta et al. |
| 5,933,593 A | | 8/1999 | Swartz et al. |
| 5,958,004 A | | 9/1999 | Helland et al. |
| 5,978,475 A | * | 11/1999 | Schneier et al. ............ 713/177 |
| 6,021,408 A | * | 2/2000 | Ledain et al. .............. 707/8 |
| 6,026,428 A | | 2/2000 | Hutchison et al. |
| 6,094,688 A | | 7/2000 | Mellen-Garnett et al. |
| 6,105,147 A | | 8/2000 | Arun et al. |

FOREIGN PATENT DOCUMENTS

| EP | 0623876 A2 | 11/1994 |
|---|---|---|
| EP | 0674260 A2 | 9/1995 |

OTHER PUBLICATIONS

Comparing Microsoft Transaction Server to Enterprise Java-Beans: White Paper, pp. 1–15, Jul. 1998.

U.S. patent application Ser. No. 09/114,230, Long, filed Jun. 30, 1998.

U.S. patent application Ser. No. 09/225,896, Helland et al., filed Jan. 4, 1999.

(List continued on next page.)

*Primary Examiner*—Gilberto Barrón
*Assistant Examiner*—Courtney D. Fields
(74) *Attorney, Agent, or Firm*—Klarquist Sparkman, LLP

(57) ABSTRACT

A transaction processing system writes log records containing transaction information into a log file in blocks of multiple disk sectors in size. The system writes a cryptographic hash result of the log block's data into a header portion of the log block. The system uses the cryptographic hash result to identify an active run of the log blocks that contains current log records of the transaction processing system. The system truncates a prefix of log blocks from the active run by modifying a part of the log block so as to invalidate the written cryptographic hash result of the log block.

24 Claims, 9 Drawing Sheets

OTHER PUBLICATIONS

U.S. patent application Ser. No. 09/351,374, Helland et al., filed Jul. 12, 1999.

Orfali et al., "Client/Server Transaction Processing," *Client/Server Survival Guide,* pp. 241–288, 1994.

Franklin, "Concurrency Control and Recovery," *The Computer Science and Engineering Handbook,* Tucker, Jr. (ed.), pp. 1058–1077, 1996.

Steinman, "Incremental State Saving in Speedes Using C++," *Proceedings of the 1993 Winter Stimulation Conference,* pp. 687–696, 1993.

Limprecht, "Microsoft Transaction Server," *IEEE,* pp. 14–18, 1997.

Gray et al., "The Role of a Compensating Transaction," *Transaction Processing: Concepts and Techniques,* pp. 204–205, 1993.

Eddon, "COM+: The Evolution of Component Services," *IEEE on Computer,* pp. 104 and 106, Jul. 1999.

*Object Transaction Service,* OMG Document 94.6.1, pp. 1–102, 1994.

"Transaction Context Objects in Microsoft Transaction Server," http://msdn.microsoft.com/library/backgrnd/html/msdn_transact.htm, pp. 1–4, Jun. 1997.

Chappell, "The Microsoft Transaction Server (MTS)," http://www.microsoft.com/Com/wpaper/mtscomp.asp, Jun. 1997.

Chappell, "Microsoft Message Queue is a Fast, Efficient Choice for Your Distributed Application," *Microsoft Systems Journal,* vol. 13, pp. 17–20, and 23–24, Jul. 1998.

Bukovec et al., "Use MSMQ and MTS to Simplify the Building of Transactional Applications," *Microsoft Systems Journal,* vol. 13, pp. 27–31, 34–36, and 39–40, Jul. 1998.

*Using the MSMQ API Functions,* pp. 1–87, 1998.

Lam, "Building Scalable Apps," *PC Magazine,* pp. 209–210, 212–214, Apr. 21, 1998.

Tomsen, "Virtually Crash–Proof Your Website with IIS 4.0," *Microsoft Interactive Developer,* vol. 2, No. 10, pp. 41–44, and 46, Oct. 1997.

Hackathorn, "Publish or Perish," http://www.byte.com/art/9709/sec6/artl.htm, *BYTE Magazine,* pp. 1–15, Sep. 1997.

Matena et al., *Enterprise JavaBeans,* Version 1.0, Sun Microsystems, pp. 1–95, 97–145, 147–181, Mar. 21, 1998.

Sessions, "Sharing and Scalability," *COM and DCOM,* pp. 249–313, 1998.

Sessions, "Clustering," *COM and DCOM,* pp. 413–442, 1998.

Bruce, "The Treatment of State in Optimistic Systems," *IEEE,* pp. 40–49, Jun. 1995.

Nance, "Balance the Load with Transaction Server," http://www.byte.com/art/9706/sec6/artl.com, *BYTE Magazine,* pp. 1–8, Jun. 1997.

McKay, "Microsoft Talks Up Tools," *InfoWorld,* vol. 20, No. 19, 2 pp., May 11, 1998.

Bowen, "Intel's Middleware Move," *InfoWorld,* vol. 20, No. 9, pp. 1–2, 1998.

Bernstein and Newcomer, "Database System Recovery," *Principles of Transaction Processing for the Systems Professional,* Morgan Kaufmann Publishers, Inc., San Francisco, CA, chapter 8, pp. 241–266 (1997).

Gray and Reuter, "Log Manager," *Transaction Processing: Concepts and Techniques,* Morgan Kaufmann Publishers, San Francisco, CA, chapter 9, pp. 493–525 (1993).

* cited by examiner

FIG. 3

```
interface ILog : IUnknown
{
    HRESULT Force ( [in] LSN lsnMinToForce );
    HRESULT AppendRecord (
        [in] BLOB* rgBlob,
        [in] ULONG cBlob,
        [in] BOOL fForceNow,
        [out] LSN* lsn );
    HRESULT ReadRecord (
        [in] LSN lsnToRead,
        [out] LSN* plsnPrev,
        [out] LSN* plsnNext,
        [out] LPVOID* ppvData,
        [out] ULONG* pcbData,
        [out] PVOID* ppvToken );
    HRESULT ReadRecordRelease ([in] PVOID pvToken);
    HRESULT ReadRecordPrefix (
        [in] LSN lsnToRead,
        [out] LSN* plsnPrev,
        [out] LSN* plsnNext,
        [out] LPVOID pvData,
        [in,out] ULONG* pcbData,
        [out] ULONG* pcbRecord );
    HRESULT GetLogLimits (
        [out] LSN* lsnFirst,
        [out] LSN* lsnLast );
    HRESULT TruncatePrefix ([in] LSN lsnFirstToKeep );
    HRESULT SetAccessPolicyHint (
        [in] RECORD_READING_POLICY policy );
};
```

```
struct LOGRECORD_IN_BLOCK
{
    ULONG   cbRecord;              // overall record size, including this count.
    BOOL    fLastInItsBlock : 1;   // is the record the last one in its block?
    ULONG   filler : 31;
    LSN     lsnPrevRecord;         // the LSN of the record prior to this one
    BYTE    data[];                // the data of the record
};
```

```
struct MASTERBLOCK : HASHEDBLOCK
{
    ULONGLONG  m_cbLog;         // How many bytes are logically in this log?
    LSN        m_lsnNext;       // LSN of next block to write at time of
                                // master sector write
    ULONG      m_cbSectorSize;  // Log file's sector size, used as a check.
    BYTE       m_filler[];      // Filler data to pad out to sector size
};
```

LOG FILE AT CHECK POINT

FIG. 9

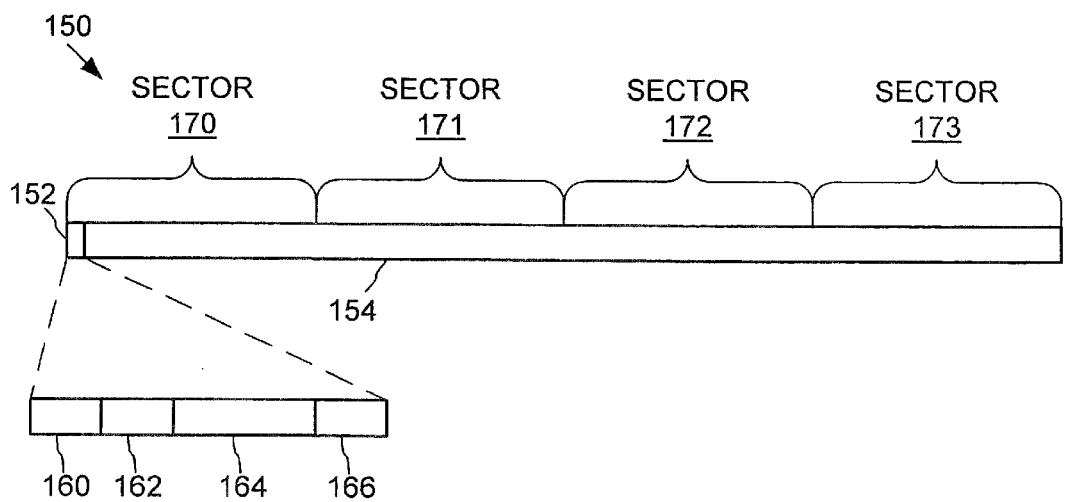

FIG. 10

```
extern const ULONGLONG __declspec(selectany)
TXFLOG_MAGIC_SIGNATURE = 0x881ef106011cbab0;

struct HASHEDBLOCK
  {
  ULONGLONG    m_rgbSignature;   // signature value
  ULONGLONG    m_cbBlock;        // count of number of 'body' bytes
  MD5HASHDATA  m_md5Hash;        // the hash of everything after this field
  };

struct LOGBLOCK : HASHEDBLOCK
  {
  LSN    m_lsn;       // LSN of the first byte of this log block
  BYTE   m_data[];    // the actual data of the block
  };
```

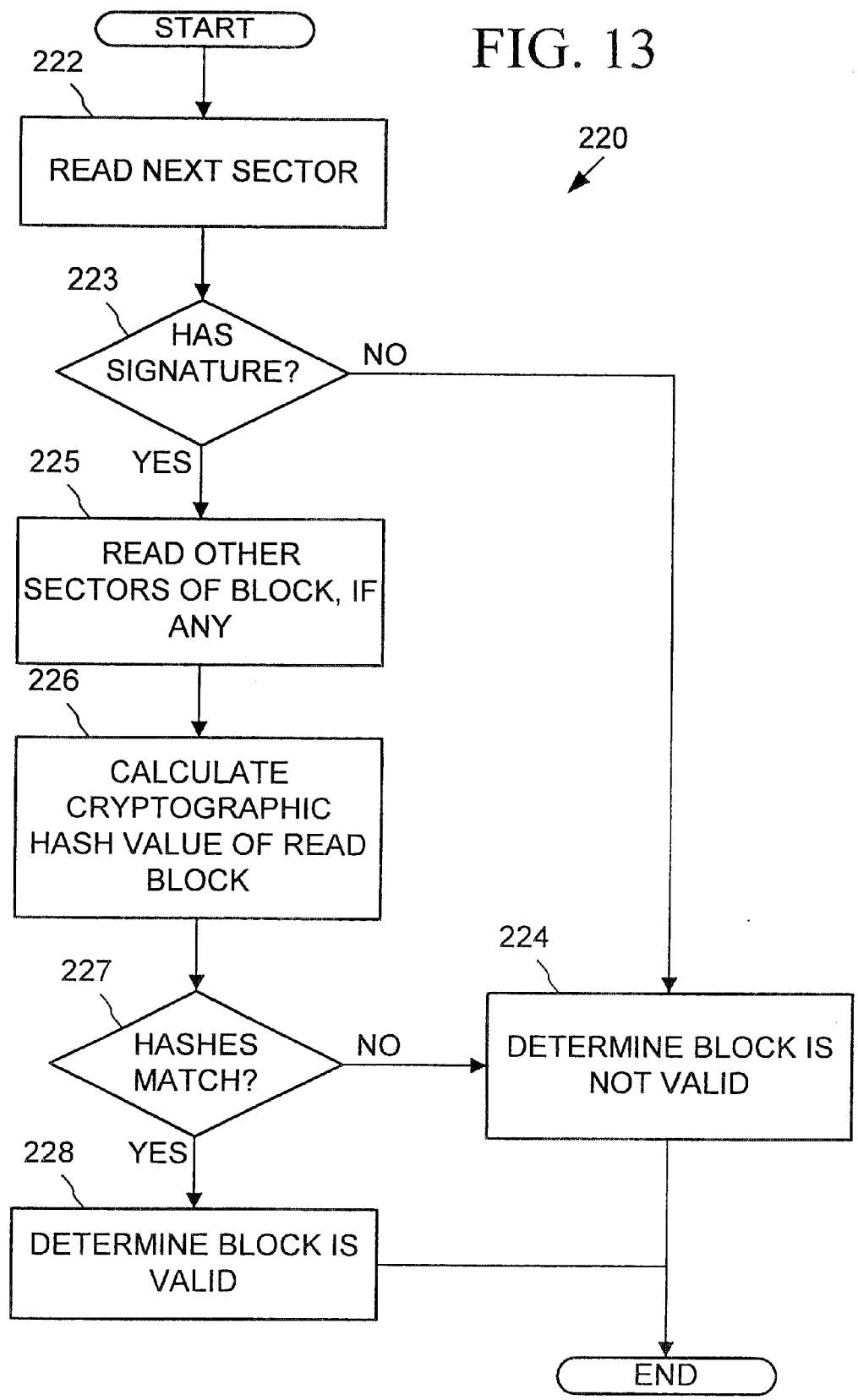

TRANSACTIONAL LOG WITH MULTI-SECTOR LOG BLOCK VALIDATION

TECHNICAL FIELD

The present invention relates generally to logging in a transaction processing system, and more particularly relates to a transactional log structure.

BACKGROUND OF THE INVENTION

In many information processing applications, a server application running on a host or server computer in a distributed network provides processing services or methods for client applications running on terminal or workstation computers of the network which are operated by a multitude of users. Common examples of such server applications include software for processing class registrations at a university, travel reservations, money transfers and other services at a bank, and sales at a business. In these examples, the processing services provided by the server application typically maintains persistent data or "state" of class schedules, hotel reservations, account balances, order shipments, payments, or inventory for actions initiated by the individual users at their respective stations, such as in a database or other proprietary format data store.

Often, server applications require coordinating processing activities of multiple separate programs (which possibly reside on different computers or in separate processes) that may modify or otherwise affect separately stored persistent data, such as database records on different computers or in separate database tables. For example, a money transfer operation in a banking application may involve updates to account information held in separate databases that reside on separate computers that may be geographically remote. Desirably, groups of these processing activities that form parts of an operation are coordinated so as to take effect as a single indivisible unit of work, commonly referred to as a transaction. In many applications, performing sets of activities as a transaction becomes a business necessity. For example, if only one account is updated in a money transfer operation due to a system failure, the bank in effect creates or destroys money.

A transaction is a collection of actions that conform to a set of properties (referred to as the "ACID" properties) which include atomicity, consistency, isolation, and durability. Atomicity means that all activities in a transaction either take effect together as a unit, or all fail. Consistency means that after a transaction executes, the system is left in a stable or correct state (i.e., if giving effect to the activities in a transaction would not result in a correct stable state, the system is returned to its initial pre-transaction state). Isolation means the transaction is not affected by any other concurrently executing transactions (accesses by transactions to shared resources are serialized, and changes to shared resources are not visible outside the transaction until the transaction completes). Durability means that the effects of a transaction are permanent and survive system failures. For additional background information on transaction processing, see, inter alia, Jim Gray and Andreas Reuter, *Transaction Processing Concepts and Techniques*, Morgan Kaufmann, 1993; and Philip Bernstein and Eric Newcomer, *Principles of Transaction Processing*, Morgan Kaufmann, 1997.

The durability property is important in transaction processing applications because each transaction is usually providing a service that amounts to a contract between its users and the enterprise that is providing the service. For example, if a user is moving money from one account to another, once the user gets a reply from the transaction processing system that the transaction executed, the user really expects that the result is permanent. This expectation may amount to a legal agreement between the user and the enterprise that the money has been moved between the user's accounts. It is therefore essential that the transaction processing system stores the updates to account data on some non-volatile data storage device, typically a hard disk drive, to ensure that the updates from a completed transaction cannot be lost.

Transaction processing systems typically obtain the durability property via a log-based recovery mechanism, which starts with the transaction processing system writing a copy of all the transaction's updates of a durable resource (e.g., a database) into a log file while the transaction is executing. On a request to commit the transaction, the transaction processing system first ensures that all records written to the log file are transferred to the hard disk (not merely in volatile cache memory), before then determining to commit the transaction. The updates to the database can then be written out to disk at any time after the decision to commit. If the system fails after the transaction commits and before the updates are made to the database, the updates can still be made during a recovery process using the persisted log records. During recovery, the system rereads the log and checks that each update by a committed transaction actually was made to the database. If not, the system applies the update to the database. When recovery is complete, the results of all committed transactions will be effected in the database and the transaction system can resume normal operation.

In general, the log is kept as a sequential file on disk, and contains a sequence of records describing updates to a durable resource (e.g., database). These records must contain sufficient information to correctly recover the state of the durable resource including all committed transactions in the event of a failure, such as a before-image, after-image and pointer of the portion of the database affected by the update. This part of a log record is termed the log record's "body," and typically is provided by a component or subsystem of the transaction processing system referred to as a "resource manager." During recovery, the information in the log record body is read back (such as, by a recovery manager) to the resource manager. The resource manager uses the after-image to effect updates for transactions that committed before the failure, and uses the before-image to reverse updates for transactions that aborted or were not committed before the failure.

In addition to log records for each update in a transaction, the log also contains log records that report when a transaction commits or aborts. Typically, the body of these log records may just contain the identifier of the transaction and an indication whether the transaction committed or aborted.

In many transaction processing systems, the log is managed by a component or subsystem termed a log manager. The log manager provides an interface by which other subsystems, such as the resource manager, a transaction manager and recovery manager, interact with the log. The log manager also provides a portion of each log record referred to as the log record header, which the log manager uses at recovery to identify the sequence of log records in the log, as well as the resource manager and transaction of each log record. For example, the following declaration defines the structure of an example generic log header.

```
typedef struct {
    LSN         lsn;            /* log sequence number of record */
    LSN         prev_lsn;       /* lsn of previous record in log */
    TIMESTAMP   timestamp;      /* time log record was created */
    RMID        rmid;           /* id of resource manager */
    TRID        trid;           /* id of transaction */
    LSN         tr_prev_lsn;    /* prev log record of transaction */
    long        length;         /* length of log record body */
    char        body[];         /* body of log record */
} log_record_header;
```

The present invention addresses two problems in log design. A first problem is that of maintaining a persistently identifiable log end (i.e., identification of the last complete log record in sequence) while frequently appending log records to the log. After a failure, the only remaining data from which the log end can be identified is the data already stored out to disk prior to the failure. Accordingly, logs for some prior transaction processing systems have stored a pointer to the end of log at a separate location on disk, such as in a separate disk file or in a header portion of the log file. This end of log pointer, possibly together with other log identifying information, is sometimes referred to as the log "anchor." A drawback to this approach, however, is that it is inefficient to write to two separate locations on the disk (i.e., the log end pointer or anchor as well as the appended log records) each time log records are appended to the log. The movement of the write head of the disk drive between the log end and log anchor locations consumes a significant amount of the time to write log records. Further, since log records are frequently written while processing transactions, the extra time to update the log end pointer with each log write detrimentally affects the transaction throughput of the transaction processing system.

A second problem relates to log writes that span multiple sectors of the log file (herein called the "multi-sector write problem"). According to a general model of the disk file that contains the log, the log consists of a sequence of fixed-length sectors. Writes to the log are made in groups of one or more sectors. Further, a failure can occur at any time during a write to the log file, but will at most cause corruption of data in only one sector (i.e., the sector being written at the time of failure) and also lose data that was to be written in subsequent sectors of the multiple-sector write. The term failure here refers to system failures (such as may be caused by a software error or power outage), and not media failures (such as may be caused by physical damage to the storage media or disk itself). As a result, the initial sector (or prefix of sectors) of a multiple-sector write that was interrupted by a failure may be correct, while some "suffix" of sectors in the multiple-sector write may be corrupt or missing. However, the fact that the suffix of the multiple-sector write was obliterated by the failure may not be detectable during recovery after the failure. In order to avoid this problem, logs for some prior transaction processing systems limit the size of writes to the log to be a single disk sector. This may be much smaller than the size of log record needed to describe a transaction's update to a durable resource. (Common disk sector sizes are 4, 8 or 16 Kbytes, which may be smaller than the size of an individual database record.)

In other words, the present invention addresses the problem of how to append data to a log file, such as for a transaction processing system, so that the act of appending persistently indicates the position of the last correctly written log data.

SUMMARY OF THE INVENTION

The present invention provides a technique for appending data in multiple sector writes to a log in non-volatile data storage in such a way that the act of writing the appended data alone indicates the last correctly written log data. The technique uses a cryptographic hash value of log data that is to be written as a block of one or more sectors appended to the log. The cryptographic hash value is written along with the block, such as in a header portion of the block. The cryptographic hash value serves as verification that the entire block was actually transferred into the non-volatile data storage sectors.

According to a further aspect of the invention, the technique also uses the cryptographic hash value of the blocks to provide a truncate prefix operation. This operation truncates a block of sectors that forms a prefix of the log and contains stale log records (e.g., log records for completed transactions, or log records that have been copied forward to a later portion of the log in a checkpoint operation), by modifying a part of the log data in the block (e.g., incrementing a byte of a last sector in the block) so as to invalidate a verification check of the block using the cryptographic hash value.

Additional features and advantages of the invention will be made apparent from the following detailed description of an illustrated embodiment which proceeds with reference to the accompanying drawings.

BRIEF DESCRIPTION OF THE DRAWINGS

FIG. 3 is a program listing of an "ILog" interface of a log object for the transactional log in the transaction processing system of FIG. 2.

FIG. 4 is a program listing of a data structure of a log record in the transactional log of FIG. 2.

FIG. 5 is a program listing of a data structure of a master log block in the transactional log of FIG. 2.

FIG. 9 is a block diagram of a multi-sector log block having a header with a cryptographic hash value in the transactional log of FIG. 2.

FIG. 10 is a program listing of a data structure of the multi-sector log block of FIG. 9.

FIG. 13 is a flow chart of a process to validate a log block in the transactional log of FIG. 2.

DETAILED DESCRIPTION OF THE INVENTION

The present invention is directed toward a log, such as for use in a transaction processing system, that uses a cryptographic hash for identification of the end of log. In one embodiment illustrated herein, the invention is incorporated into an operating system, entitled "Microsoft Windows 2000" (formerly known as Windows NT Server 5.0), marketed by Microsoft Corporation of Redmond, Wash. Briefly described, this software is a scaleable, high-performance network and computer operating system supporting distributed client/server computing. In the Microsoft Windows 2000, the illustrated log operates in combination with a transaction processing system, including the Microsoft Distributed Transaction Coordinator (MSDTC).

Exemplary Operating Environment

Figure 1:
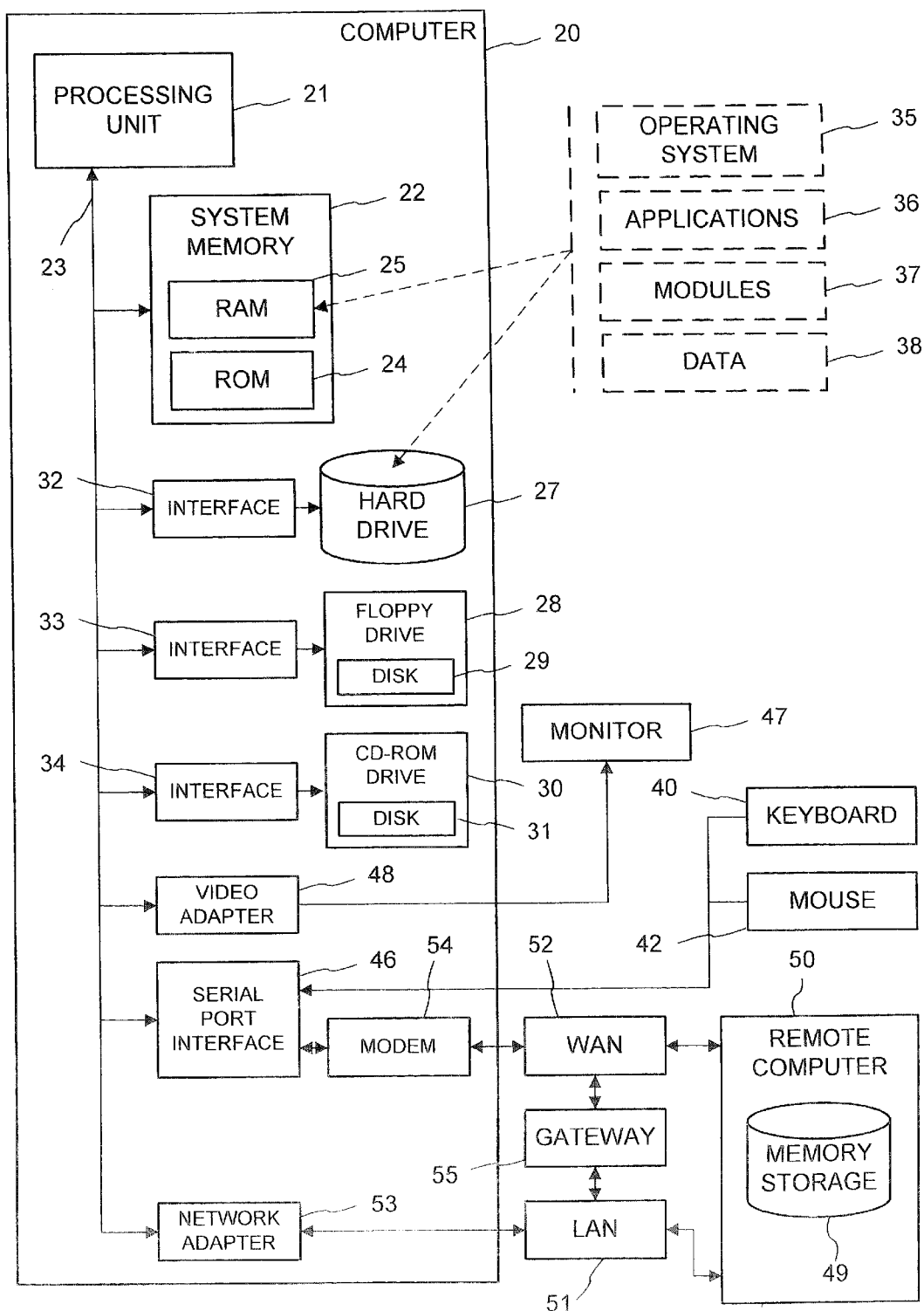
FIG. 1 is a block diagram of a computer system that may be used to implement a method and apparatus embodying the invention for a transactional log with multi-sector log block validation.

FIG. 1 illustrates an example of a computer system 5 that can serve as an operating environment for the illustrated transactional log. With reference to FIG. 1, an exemplary computer system for implementing the invention includes a computer 20 (such as a personal computer, laptop, palmtop, set-top, server, mainframe, and other varieties of computer), including a processing unit 21, a system memory 22, and a system bus 23 that couples various system components including the system memory to the processing unit 21. The processing unit can be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus can be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, other types of media which are readable by a computer, such as magnetic cassettes, flash memory cards, digital video disks, Bernoulli cartridges, and the like, can also be used in the exemplary operating environment.

A number of program modules can be stored in the drives and RAM 25, including an operating system 35, one or more application programs 36, other program modules 37, and program data 38.

A user can enter commands and information into the computer 20 through a keyboard 40 and pointing device, such as a mouse 42. Other input devices (not shown) can include a microphone, joystick, game pad, satellite dish, scanner, or the like. These and other input devices are often connected to the processing unit 21 through a serial port interface 46 that is coupled to the system bus, but can be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 can operate in a networked environment using logical connections to one or more other computer systems 50. The other computer systems 50 can be servers, routers, peer devices or other common network nodes, and typically include many or all of the elements described relative to the computer 20, although only a memory storage device 49 has been illustrated in FIG. 1. The logical connections depicted in FIG. 1 include a local area network (LAN) 51 and a wide area network (WAN) 52. Such networking environments are common in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications (e.g., via the LAN 51 and a gateway or proxy server 55) over the wide area network 52, such as the Internet. The modem 54, which can be internal or external, is connected to the system bus 23 via the serial port interface 46. In a networked environment, program modules depicted relative to the computer 20, or portions thereof, can be stored in the remote memory storage device. The network connections shown are exemplary and other means of establishing a communications link between the computer systems 5 (including an Ethernet card, ISDN terminal adapter, ADSL modem, 10BaseT adapter, 100BaseT adapter, ATM adapter, or the like) can be used.

In accordance with the practices of persons skilled in the art of computer programming, the illustrated transactional log is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Transaction Processing System

Figure 2:
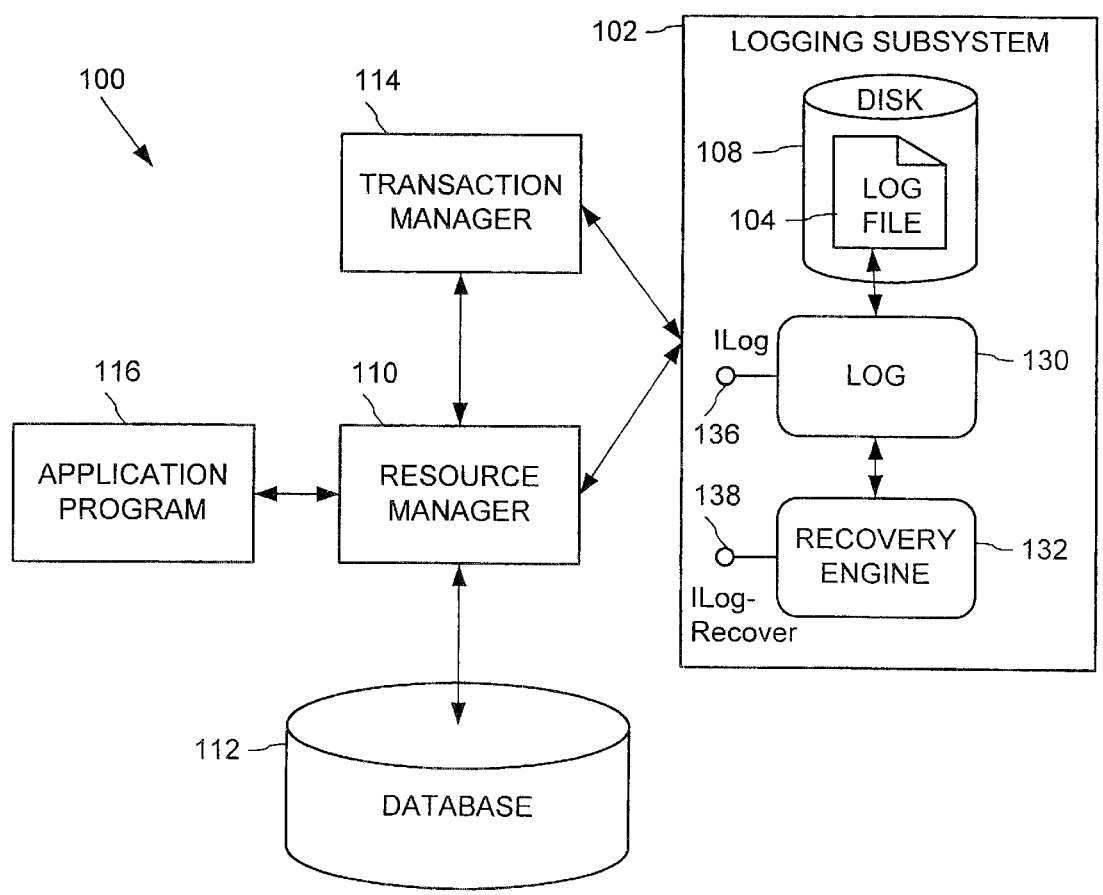
FIG. 2 is a block diagram of a transaction processing system that incorporates the transactional log with multi-sector log block validation.

With reference to FIG. 2, a transaction processing system 100 in an illustrated embodiment of the invention has a logging subsystem 102 that uses a cryptographic hash for appending log data in writes of multiple-sector length blocks to a log file 104 stored on a non-volatile data storage device, such as a hard disk 108. The cryptographic hash serves for verification at recovery after a system failure that the block was successfully transferred onto the hard disk 108. The cryptographic hash also is used for prefix truncation by the logging subsystem.

The illustrated transaction processing system 100 has a conventionally known architecture, including a resource manager 110 for a database 112 or like durable resource, and a transaction manager 114 that provide transaction processing for an application software program 116. This architecture can be multi-tiered and configured to run on a distributed network of server and workstation or terminal computers, such as the computers 20, 49 of FIG. 1. One example of a suitable architecture for the transaction processing system 100 is the Microsoft Distributed Component Architecture (MDCA), which utilizes transaction processing services implemented in the Microsoft Transaction Server (MTS), the Microsoft Distributed Transaction Coordinator (DTC), and the Microsoft SQL Server, all available from Microsoft Corporation of Redmond, Wash. For a more detailed discussion of the MDCA architecture, see inter alia, Roger Sessions, *COM and DCOM, Microsoft's Vision For Distributed Objects*, John Wiley & Sons, Inc., New York, 1998. The illustrated log also is suitable for use in other transaction processing system architectures.

The resource manager 110 is a subsystem of the transaction processing system 100 that provides services to manage durable data (e.g., data in the database 112) on a transactional basis. Specifically, the resource manager 110 supports performing changes or updates by the application 116 to data stored on the database 112 in transactions conforming to the well-known ACID properties. The application software program 116 can use the resource manager 110 to maintain the durable state of the application (such as, the record of inventory on hand, pending orders, and accounts receivable in an on-line sales application). Examples of resource managers in the illustrated embodiment include databases (such as the Microsoft SQL Server), durable message queues, and transactional file systems.

The transaction manger 114 is a subsystem of the transaction processing system 100 that coordinates transactions that span multiple resource managers, including where the resource managers reside on more than one server computer in a distributed network. The transaction manager 114 ensures that updates across all resources managers 110 involved in a transaction occur in conformance with the ACID properties, such by using the well known two-phase commit protocol, regardless of failures. An example of a suitable transaction manager is the Microsoft Distributed Transaction Coordinator (MSDTC).

The resource manager 110 and the transaction manager 114 both use the logging subsystem 102 to record information necessary for conformance with the ACID properties in the course of processing transactions of the application software program 116. This information includes all updates to the database 112 that form part of the transaction, as well as the status or outcome of the transaction (e.g., whether the transaction committed or aborted). The resource manager 110 and the transaction manager 114 pass this information to the logging subsystem 102, which records the information sequentially as log records in the log file 104 on the hard disk 108. The logging subsystem 102 is responsible for ensuring that the information is recorded in correct sequence, and maintained persistently so as to be available for recovery of the transaction processing system 100 in the event of a failure.

Logging Subsystem

The illustrated logging subsystem 102 of FIG. 2 is implemented as a log object 130, a recovery engine 132, and the log file 104. The log object 130 and the recovery engine 132 are built as objects conforming to the well known Microsoft Component Object Model ("COM") (i.e., is implemented as a "COM Object"). The COM specification defines binary standards for components and their interfaces (groupings of functions or "methods" that are exported or exposed for access from a client program) which serves as a convenient technique for structuring programs as reusable components that can be easily integrated to form software systems. By convention, the interfaces of a COM object are illustrated graphically as a plug-in jack as shown for the log object 130 and recovery engine 132 in FIG. 2. Also, interfaces conventionally are given names beginning with a capital "I." For a detailed discussion of OLE, see Kraig Brockschmidt, *Inside OLE, Second Edition*, Microsoft Press, Redmond, Wash., 1995.

The log object 130 is a COM object that encapsulates a serial stream of log records, and is responsible for stably writing a sequential stream of log records into the log file 102. The log object 130 provides services through an "ILog" interface 136 to the resource manager 110 and the transaction manager 114. The "ILog" interface 136 has methods for writing and reading the log records from the log file 102 as shown in the program listing 140 of FIG. 3.

The recovery engine 132 is a COM object that provides services through an "ILogRecover" interface 138 and "ILogRecoverClerkRegistration" interface for processing the log records from the log file 104 following a system restart according to a log recovery protocol to effect recovery from failures. The recovery processing implemented in the illustrated recovery engine 132 is based on the well known ARIES log recovery protocol, although another log recovery protocol or a variation thereof can instead be used. (See, C. Mohan, D. Haderle, B. Lindsay, H. Pirahesh and P. Schwarz, ARIES: *A Transaction Recovery Method Supporting Fine-Granularity Locking and Partial Rollbacks Using Write-Ahead Logging*, in Readings In Database Systems, Second Edition (Michael Stonebraker ed. 1994).) The resource manager 110 registers with the recovery engine 132 so that log records written by the resource manager can be provided by the recovery engine 132 during recovery. The recovery engine 132 also enlists with the transaction manager 114 via the well known OLE Transactions interfaces on any transactions in which the resource manager participates to receive notifications as to transaction status (e.g., prepare, commit and abort notifications of the well-known two-phase commit protocol).

The log file 104 is a serial data stream stored in non-volatile memory (e.g., on the hard drive 27 in FIG. 1), such as a file of a file system recorded on the hard disk 108. As per conventional disk storage techniques, the log file 104 is recorded on the hard disk 108 as a sequence of disk sectors. Further, data is read and written to the hard disk 108 in units of sectors, each of which stores a fixed quantum of data whose size depends upon the disk's configuration (e.g., 1, 2, 4, and 8 Kbytes are common sector sizes). The log object 130 reads and writes data to the log file 104 in units of "blocks," which are integer multiples of a disk sector in size.

More specifically, the clients (i.e., the resource manager 110 and the transaction manager 114) of the log object 130 write information to the log as variable length "log records." The log object 130 aggregates the log records into "log blocks," which are the quanta of writing onto the hard disk 108. Periodically, the resource manager 110 or transaction manager 114 indicates to the log object 130 (e.g., via the "Force( )" method, or the "fForceNow" parameter of the "AppendRecord( )" method shown in the program listing of FIG. 3) that log records are to be "forced to disk." This causes the log object 130 to pad the presently accumulating log records in the current log block out to a next multiple of the hard disk's sector size, and write the log block out to the hard disk 108. Accordingly, the log blocks are always an integer multiple of the sector size.

Log File Structure

With reference to FIG. 4, the illustrated log file 104 (FIG. 2) that is written by the log object 130 on the hard disk 108 has an organization that begins with two copies of a master block. These master block copies are recorded as separate sectors on the hard disk 108, and have a data structure shown in a program listing 146 of FIG. 4. The master block, critically, contains the authoritative logical length of the log file's data stream (stored as the "m_cbLog" parameter of the master block). The master block also contains parameters (i.e., the "m_lsnNext" and "m_cbSectorSize") to store the log sequence number or LSN (described below) of the next log block to be written at the time the master block is written to the log file 104, and the sector size of the log file. The master blocks are padded to fill out a full sector in size.

The master blocks are updated when the log object 130 grows the log file 104 as described below. The master blocks are followed by the actual log data which the log object 130 writes in multiple-sector length blocks, through to the logical length of the stream. The log object 130 writes the log blocks into this space circularly, and the log file's data stream is grown as needed.

Figure 6:
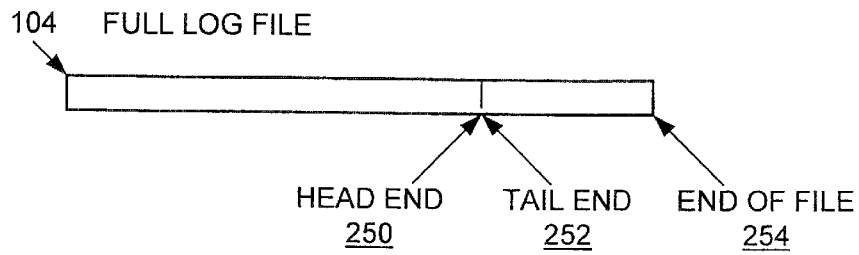
FIG. 6 is a block diagram of a log file for the transactional log of FIG. 2 when full.
Figure 7:
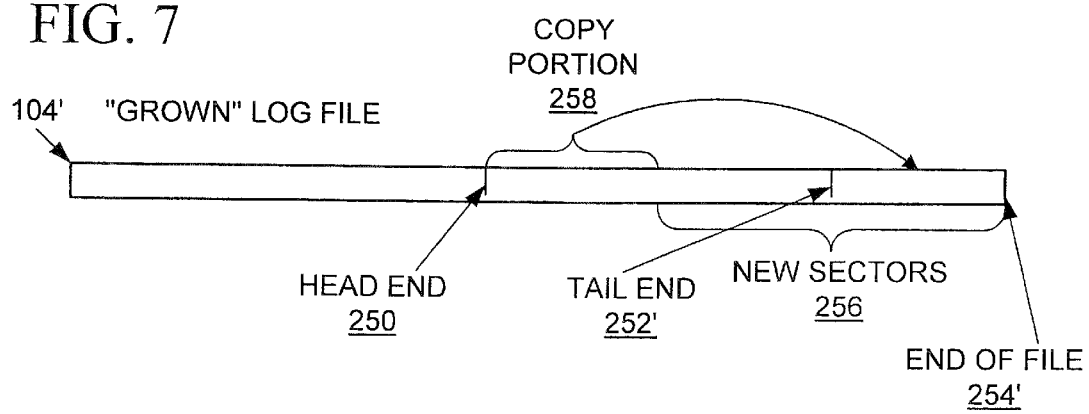
FIG. 7 is a block diagram of the log file of FIG. 6 when grown.

More particularly, the log object 130 manages the log blocks in the log file 104 as a circular buffer. The log object 130 appends new log blocks as a suffix to an active "run" of log records, and periodically truncates a prefix of no longer needed log records from the active run. When the end of the log file 104 is reached while appending new log blocks, the log object 130 wraps to the start of the log file 104 and overwrites the truncated log records with the new log blocks. If the log file 104 becomes full as shown in FIG. 6 (e.g., the "head" end 250 of the active run to which new log blocks are appended "catches up" to the "tail" end 252 from which log records are truncated), the log object 130 "grows" the log file in its middle between head and tail ends of the active run by allocating additional disk sectors 256 (FIG. 7) to the prior end of the log file 254 (FIG. 6), and copying the portion of the active run from the tail end 252 of the active run to the prior end of the log file 254 (i.e., copy portion 258 of FIG. 7) over to the space up to the new end of the log file 254' to yield grown log file 104' shown in FIG. 7. This results in a new location of the tail end 252' shown in FIG. 7. The log object 130 then continues to append new log blocks in the middle space just created by this "copy forward" operation after the head end of the active run. As used herein, the terms, "head end" and "tail end" of the active run, refer to the most recently written block (with highest LSN) and least recently written block (with lowest LSN) of the active run, respectively.

Figure 8:
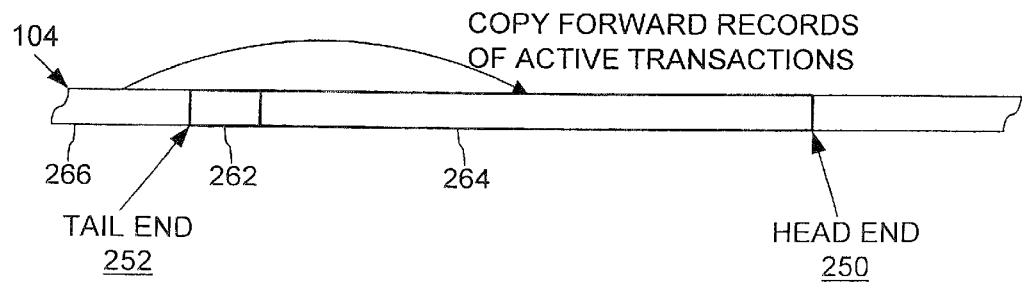
FIG. 8 is a block diagram of the log file of FIG. 6 in a check point operation.

The resource manager 110 and the transaction manager 114 inform the log object which log records to truncate via the "TruncatePrefix( )" method of the "ILog" interface shown in FIG. 3. In general, the log records for a transaction can be "forgotten" in this manner after the transaction commits and all transactional work on durable resources (e.g., database updates) have been effected, or the transaction aborts and all durable resources have been returned to their pre-transaction state. However, since the records for one transaction are generally interspersed in the log file with those of other transactions, the resource manager 110 and the transaction manager 114 typically truncate the prefix portion of the active run as part of a check point operation illustrated in FIG. 8. During the check point operation, the resource manager 110 and the transaction manager 114 write a "checkpoint" record 262 and copy forward all log records 264 of the active transactions by appending them anew to the active run after the checkpoint record. The prefix 266 of the active run containing the forward-copied log records and any no-longer-needed log records can then be truncated. After truncation, the tail end 252 has moved to the start of the checkpoint record 262, while the head end 250 has advanced by the length of the checkpoint record 252 and forward copied records 264. In some implementations of the transactional log, more than one checkpoint may be kept in the active run. In such cases, the prefix up to the oldest checkpoint to be kept in the active run is truncated from the active run.

Log Record Structure

With reference to FIG. 4, a program listing 144 shows the structure of a log record that is written as part of a log block into the log file 104 on the hard disk 108. Each log record is numbered in sequence of the order in which it was received from the resource manager 110 or the transaction manager 114 with a log sequence number (LSN), which have a monotonically increasing sequence. The illustrated log object 130 assigns as the LSN of each log record its byte number in the "unwrapped" log file, represented as a 64-bit integer. The unwrapped byte number is the offset of the log record in the log file if the log file had been written as a continuous sequential file, rather than as a circular buffer with wrapping. As shown in the program listing 144, each log record contains data values for the size of the log record, a flag to indicate whether the log record is last in its log block, the LSN of the previous record, and the data stream received from the resource manager or transaction manager for recording in the log record. The log records of the illustrated log 102 have no intrinsic size limit, but are practically limited by the capacity of the hard drive 108 and addressing capability of the computer 20.

Log Block Structure

With reference now to FIGS. 9 and 10, each log block (e.g., example log block 150) written by the log object 130 has a structure defined in a program listing 148 shown in FIG. 10, which contains a header 152 and body 154. The block's header 152 contains data values of a block signature 160, a size 162, a cryptographic hash result 164, and an LSN 166. The body 154 contains a sequence of log records that were accumulated from the log object's clients (e.g., the resource manager 110 and the transaction manager 114), since the last log block written. As previously indicated, the body 154 is padded with blank data after the log record sequence to fill out an integer number of sectors (e.g., the four sectors 170–173 of the example log block 150). The log object 130 thus is able to write the log block in a sector-aligned, multiple-sector length write, without need of partially rewriting a last sector of a previously written block.

The block signature 160 (indicated by the "m_rgbSignature" parameter in the program listing 148 of FIG. 10) is a predefined value that is used by the log object 130 to identify the start sector of a block in the log file 104 during recovery processing.

The size 162 (indicated by the "mcbblock" parameter) is a count of the number of bytes of the body 154.

The cryptographic hash result 164 (indicated by the "m_md5Hash" parameter) is a value calculated as a cryptographic hash function from the remaining data in the block (i.e., the LSN 166 and body 154). Alternatively, the cryptographic hash result can be calculated from more or less of the data contained in the block than illustrated here (e.g., the LSN also can be excluded from the hash, or the size, signature or hash result included). The illustrated log object 130 uses a routine based on the conventionally known MD5 cryptographic hash to generate the cryptographic hash result 164. Alternatively, other cryptographic hash functions, such as MD4, can be used.

The LSN 166 (indicated by the "m_lsn" parameter) is a sequence number of the block calculated in the same manner as the LSNs of the log records, i.e., the byte offset of the block in the unwrapped file.

Recovery

At recovery, the log object 130 (FIG. 2) serves to identify a run of log blocks in the log file 104 that was active at failure. As previously indicated, the recovery engine 132 processes these records so as to recover the state of the transactional system (e.g., that of the resource manager 110) at failure.

Figure 11:
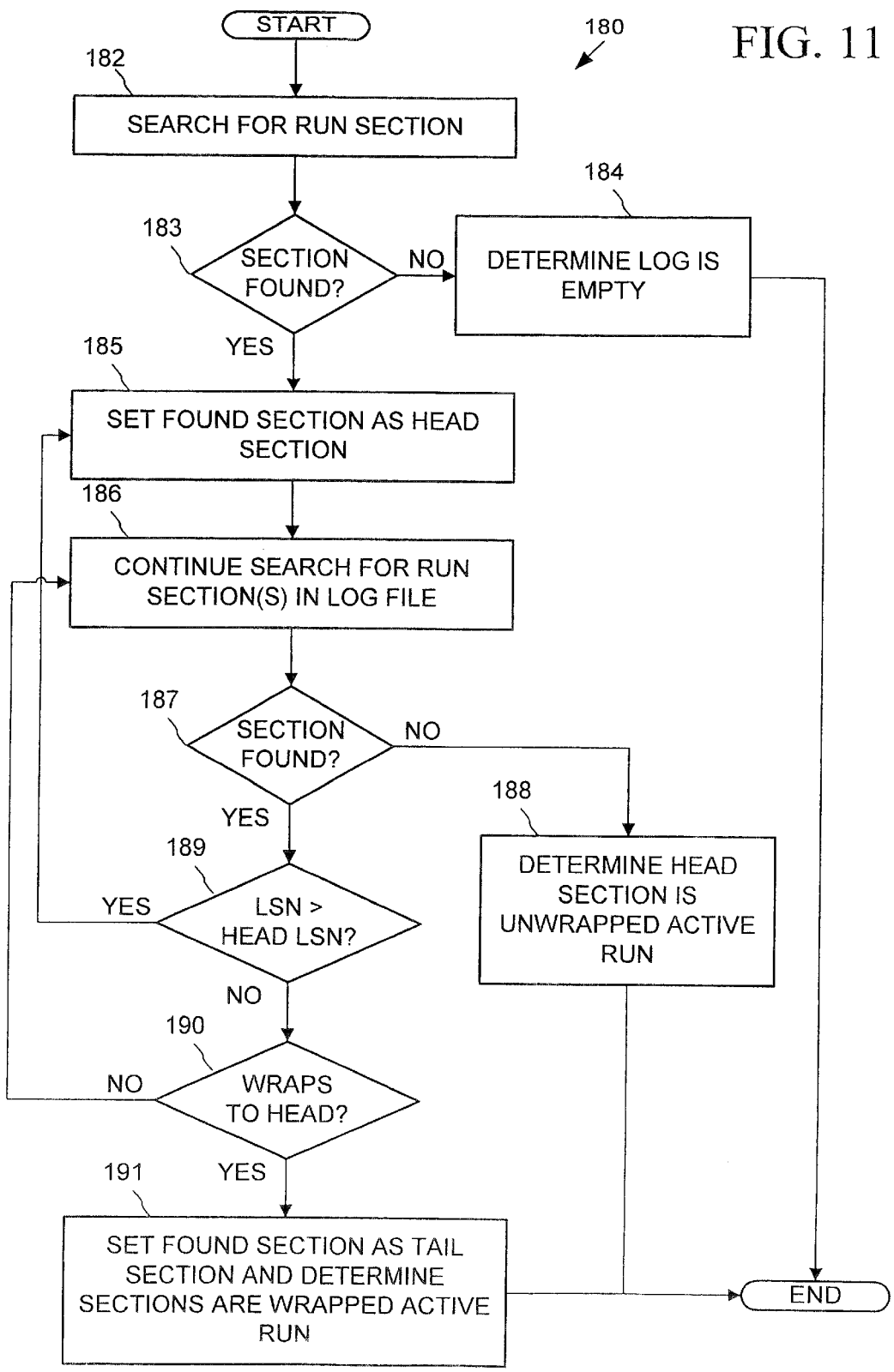
FIG. 11 is a flow chart of a process to recover an active run of log blocks in the transactional log of FIG. 2.

The log object 130 (FIG. 2) begins its processing at recovery by identifying the active run of log blocks in the log file 104 using an active run recovery process 180 shown in FIG. 11. Because the log file 104 was written circularly, the active run of log blocks may be wrapped, and may possibly have up to two separate sections—a first or head end section from the beginning of the log file up to the head end of the active run and a second section from the tail end of the active run to the end of the log file. Further, if a failure interrupts the copy forward of this second section during an attempt to "grow" the log as described above, then there may be an additional partial copy of the tail end section in the log file 104. However, only one of these two copies will abut to the end of the data stream in the log file indicated by the data stream length recorded in the master block, and qualifies as the "tail-end" section of the active run. Each of these sections will contain a sequence of consecutive log blocks whose LSNs are in increasing order.

In the active run recovery process 180 of FIG. 11, the log object 130 scans the log file 104 to locate the possible 0, 1 or 2 sections of the active run (for the three cases of an empty log, an unwrapped run, and a wrapped run, respectively). At an initial step 182, the log object 130 searches for a first run section of blocks. The run is made of consecutive blocks that were written in sequence, so that the LSN of each successive block equals the LSN of the previous block plus the previous block's length. The run section ends if the end of the log file 104 is reached, or at a log block whose LSN does not follow in sequence from the run section thus far recovered. More particularly, the log object 130 searches for a run of blocks during the scan of the log file 104 using a run subsection recovery process 200 shown in FIG. 12 and described below.

As indicated at steps 183–184, the log object 130 determines that the log file 104 is empty if no run subsection is found in the search of step 182. However, if a run subsection is located, the log object 130 designates the run subsection as the head end section at step 185.

Figure 12:
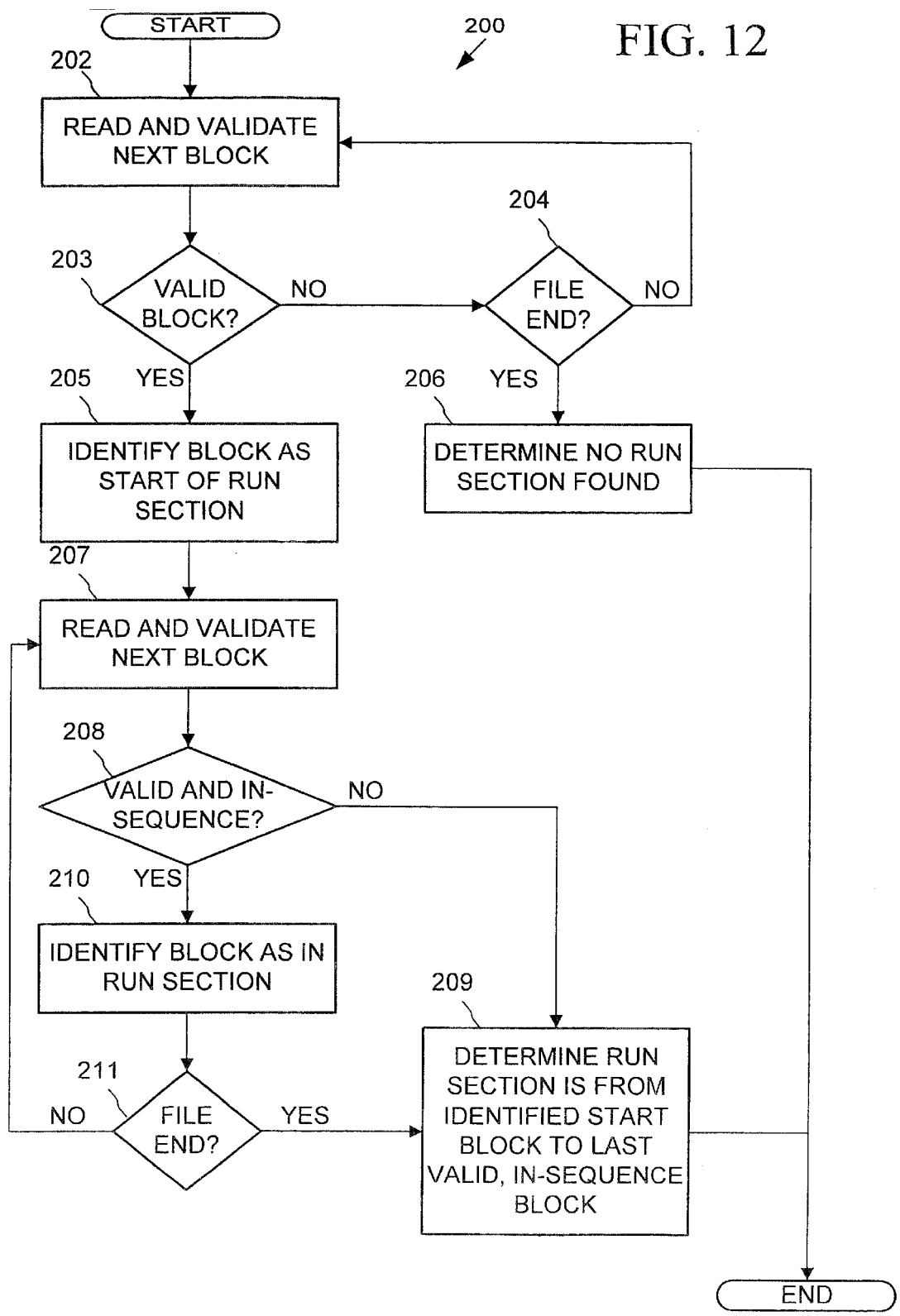
FIG. 12 is a flow chart of a process to recover a run subsection in the transactional log of FIG. 2.

At a next step 186, the log object 130 continues the scan searching for a second run subsection using the process 200 of FIG. 12. If no further run section is found, the log object 130 determines as indicated at steps 187–188 that the first run section (that was designated as the head end section) is an unwrapped run. On the other hand, if a further run section is found that has a higher LSN (i.e., was more recently written), the log object 130 determines as indicated at steps 189 and 185 that this new run section should properly be designated the head end run section. The new run section can not be the tail end run section of a wrapped run because its LSN is more recent than the previously located run section and therefore does not match the characteristics of a wrapped run. Being more recently written, the new run section is taken as the better candidate for the active run than the previously located run section.

Otherwise, as indicated at steps 190–191, the log object 130 checks whether the new run section matches up to the designated head end section. The two sections are a tail end-to-head end match if the LSN of the last block in the new run section plus its length equals the LSN of the first block in the head end section. If the sections match up, the log object 130 designates the new section as the tail end section of the active run and determines that the active run is a wrapped run. If the new run section is not a tail-end match to the head-end run section, the log object 130 continues the search at step 186.

With reference to FIG. 12, the run section recovery process 200 (which is used at steps 182 and 186 of the active run recovery process 180 of FIG. 11) begins at a step 202 with the log object 130 reading and validating a next log block from the log file 104. When the process 200 is performed in the step 182 of the process 180 (FIG. 11), the log object 130 begins the reading and validating with the first sector of the log file 104 after the two copies of the master block. When performed at step 186 (FIG. 11), the process 200 begins with the sector following the run section previously located. The log object 130 validates the log block using a log block validation process 220 shown in FIG. 13 and described below. As indicated at steps 203–204, the log object 130 continues to read and validate log blocks (on a sector-by-sector basis) until a valid log block is found or the end of the log file 104 is reached. If a valid log block is found, the log object 130 identifies that log block as the start block of a run section as indicated at a step 205. On the other hand, if the end of the log file 104 is reached without encountering a valid log block, the log object 130 determines that the searched portion of the log file contains no run section.

At steps 207–211, the log object 130 continues to read, validate and add log blocks to the run section identified at step 205. At step 207, the log object 130 reads the next log block that starts at the sector following the last identified block of the run section. If a valid log block exists at this sector and such log block matches in sequence of the run section, the log object 130 adds the log block to the run section at step 210. The log block is considered to be in sequence if the log block has an LSN equal to the LSN of the last log block yet identified in the run section plus the length of the last identified log block.

The log object 130 continues to add valid, in-sequence log blocks to the identified run section until the end of the log file 104 is reached (step 211) or an invalid or out-of-sequence log block is encountered (step 208). At any of these events, the log engine 132 determines that the run section extends from the identified start log block of the run section to the last valid, in-sequence log block.

With reference now to FIG. 13, the log block validation process 220 (which is used at steps 202 and 207 of the run section recovery process 200 of FIG. 12) determines that a particular sector location of the log file 104 contains a correctly written, intact log block. The process 220 begins at a step 222 with the log object 130 (FIG. 2) reading the data contents from a selected sector (hereafter the log block's "start sector," e.g., sector 170 in the example log block 150 of FIG. 9) of the log file 104. The particular sector is the current location at which the run sector recovery process 220 (FIG. 12) is searching for a run section during the log file scan in the active run recovery process 180 (FIG. 11).

At a step 223, the log object 130 checks that the start sector read at step 222 contains the log block signature 160 (FIG. 9) in the proper location of a log block header 152 (FIG. 9). As indicated at step 224, the log object 130 determines that the sector is not the start sector of a valid log block if this signature is missing.

Otherwise, if the start sector contains the log block signature 160, the log object 130 at a step 225 reads all other remaining sectors of the log block (e.g., sectors 171–173 in the example log block of FIG. 9) as indicated by the log block size 162 recorded in the start sector. At a step 226, the log object 130 then recalculates the cryptographic hash value over the log block's data that was read back from the disk 108 (FIG. 2) at steps 222 and 225. At step 227, the log object 130 compares this recalculated cryptographic hash value to the cryptographic hash value recorded in the log block's header (e.g., the cryptographic hash value 164 in the example log block 150 of FIG. 9). If these values match, then the log object 130 at a step 228 determines that the log block is valid. Otherwise, if the values do not match, the log object 130 determines that log block is not valid as indicated at steps 227 and 224.

Prefix Truncation

With reference again to FIG. 2, the log object 130 also uses the cryptographic hash value 164 (FIG. 9) for prefix truncation. As previously discussed, the resource manager 110 and the transaction manager 114 will at times (e.g., during a checkpoint operation) indicate to the log object 130 (e.g., via a call to the "TruncatePrefix( )" method of the log object's "ILog" interface shown in FIG. 3) that a prefix portion of the active run of log blocks are no longer needed. The log object 130 truncates the specified prefix portion in the log file 104 by modifying one or more bytes of each block in the prefix, so as to invalidate the cryptographic hash value 164 (FIG. 9) of the blocks. For example, the log object 130 can invalidate each block's cryptographic hash value by incrementing a last byte of a last sector of the respective block, by flipping a single bit in the block (i.e., changing a 0-bit to a 1-bit and vice versa), or like modification that causes the cryptographic hash function to produce a different result value. Consequently, when the log file 104 is scanned by the log object 130 during recovery processing, the active run recovery process 180 of FIG. 11 will not recognize the truncated prefix portion as being part of the active run (i.e., because the truncated blocks will fail the log block validation process 220 of FIG. 13).

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

It should also be understood that the log file may be written as other than a circular buffer. For example, the transactional log using cryptographic hash may be written in continuous sequence, where the log is restarted in a new log file as needed and old log files in the sequence may be archived onto archival data storage media.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

I claim:

1. A transaction processing system comprising:
   a non-volatile data storage for durably maintaining a log file; and
   a logging subsystem operating to write log records to the log file on the non-volatile data storage in blocks of multiple sectors, a block having a header portion and a body portion, the body portion containing a group of one or more log records, the header portion containing a cryptographic hash value calculated from at least the body portion of the block,
   the log file having a prefix portion consisting of blocks with invalid cryptographic hash values and preceding a sequence of active log records.

2. The transaction processing system of claim 1, wherein the header portion further contains a block signature, and a block size.

3. The transaction processing system of claim 1, wherein the header portion further contains a log sequence number.

4. The transaction processing system of claim 1, wherein the logging subsystem further operates to truncate a prefix portion of an active run in the log file, where the prefix portion contains the block, and wherein truncating the prefix portion comprises the logging subsystem modifying a piece of the block so as to invalidate the cryptographic hash value.

5. The transaction processing system of claim 1, wherein the logging subsystem further operates to recover an active run of log records from the log file using a process comprising scanning the log file for a contiguous group of log blocks with header portions that contain valid cryptographic hash values.

6. The transaction processing system of claim 1, wherein the header portion further contains a block size, and wherein the logging subsystem further operates to recover an active run of log records from the log file using a process comprising the steps of:
   reading data of a selected sector of the log file;
   retrieving the cryptographic hash value and block size of a block starting at the sector from the sector's data;
   reading data of any subsequent sectors of the log file up to the block size;
   calculating a new cryptographic hash value from the read data; and
   determining that the block is valid if the new cryptographic hash value matches the retrieved cryptographic hash value.

7. The transaction processing system of claim 6, wherein the header portion further contains a block signature, and the process used by the logging subsystem to recover the active run of log records further comprises the steps of:
   checking that the data read from the selected sector has the block signature; and
   determining that the selected sector is not the start of a valid log block if the selected sector lacks the block signature.

8. In a computer-readable data storage system, a transactional log comprising:
  a plurality of log blocks individually written as a sequence of sectors, where each log block has an integer multiple of sectors in the sequence; and
  a log block header per log block, the log block header containing a cryptographic hash calculated over at least a portion of the respective log block and excluding any previous log block.

9. The computer-readable data storage system of claim 8, wherein the log block header further comprises a predefined block signature for identifying a sector of the computer-readable data storage system that contains the predefined block signature as a starting sector of a log block.

10. The computer-readable data storage system of claim 8, wherein the log block header further comprises a block size for identifying a number of the sectors of the computer-readable data storage system that constitute a log block.

11. The computer-readable data storage system of claim 8, wherein the log block header further comprises a log sequence number for determining whether a log block stored in a group of sectors of the computer-readable data storage system is in sequence with log blocks stored in adjacent groups of sectors.

12. In a transaction processing system, a method of recoverably logging information of transactions as a file on a data storage device, the method comprising:
  accumulating a plurality of log records containing transactional information;
  padding the accumulated log records to form a log block of a length equal to an integer number of sectors of the data storage device;
  generating a cryptographic hash result as a function of the accumulated log records of the log block;
  creating a log block header containing the cryptographic hash result; and
  writing the log block with the log block header included therein onto the data storage device in the integer number of sectors.

13. The method of claim 12, further comprising placing a predefined block signature into the log block header for identifying a sector of the data storage device that contains the predefined block signature as a starting sector of a log block.

14. The method of claim 12, further comprising placing a block size into the log block header for identifying the integer number of sectors of the data storage device that constitute the log block.

15. The method of claim 12, further comprising:
  generating a log sequence number indicating a placement of the log block in a sequence of log blocks written to the data storage device; and
  placing the log sequence number in the log block header.

16. The method of claim 12, further comprising:
  placing a predefined block signature into the log block header for identifying a sector of the data storage device that contains the predefined block signature as a starting sector of a log block;
  placing a block size into the log block header for identifying the integer number of sectors of the data storage device that constitute the log block;
  generating a log sequence number indicating a placement of the log block in a sequence of log blocks written to the data storage device; and
  placing the log sequence number in the log block header.

17. The method of claim 12, further comprising:
  writing a plurality of log blocks circularly into a file on the data storage device; and
  placing a log sequence number into the block header of each log block, where the log sequence number is the unwrapped byte offset of the log block in the circularly written file.

18. The method of claim 17, further comprising:
  placing a block size into the block header of each log block, where the block size is the byte length of the log block, whereby the log sequence number of a log block equals the sum of the log sequence number and the block size of an immediately preceding log block.

19. A computer-readable storage medium having computer-executable program code stored thereon for causing a computer to perform the steps of the method of claim 12.

20. In a transaction processing system, a method of recoverably logging information of transactions as a log file on a data storage device, the method comprising:
  writing log records into the log file on the data storage device as a sequence of log blocks having lengths equal to integer multiples of a sector size on the data storage device, the log blocks having a block header with a cryptographic hash result calculated from at least the log records in the respective log block;
  truncating a prefix portion of the sequence of log blocks by modifying data in at least one sector of each log block in the prefix portion so as to invalidate the cryptographic hash result in the block header of the log block.

21. The method of claim 20, wherein the step of modifying data in at least one sector of each log block in the prefix portion comprises incrementing a byte of the sector.

22. The method of claim 20, wherein the step of modifying data in at least one sector of each log block in the prefix portion comprises flipping a value of a bit in the sector.

23. In a transaction processing system, a method of recovering log records containing transaction information from a log file on a data storage device, the log records being written in the log file as multiple sector-length log blocks, the method comprising:
  reading data of a selected sector of the log file;
  retrieving a cryptographic hash value and block size of a block starting at the selected sector from the sector's data;
  reading data of any subsequent sectors of the log file up to the block size;
  calculating a new cryptographic hash value from the read data;
  determining that the block and any preceding blocks are invalid if the new cryptographic hash value does not match the retrieved cryptographic hash value; and
  determining that the block is valid if the new cryptographic hash value matches the retrieved cryptographic hash value.

24. The method of claim 23, further comprising:
  checking that the data read from the selected sector has a predefined block signature; and
  determining that the selected sector is not the start of a valid log block if the selected sector lacks the predefined block signature.

* * * * *